United States Patent [19]
Lew

[11] Patent Number: 5,317,918
[45] Date of Patent: Jun. 7, 1994

[54] HIGH RESOLUTION PRESSURE SENSOR

[76] Inventor: Hyok S. Lew, 7890 Oak St., Arvada, Colo. 80005

[21] Appl. No.: 885,032

[22] Filed: May 18, 1992

[51] Int. Cl.⁵ .............................................. G01L 9/12
[52] U.S. Cl. ...................................... 73/718; 73/724; 73/733; 361/283.3
[58] Field of Search ................. 73/724, 718, 729, 733; 361/283

[56] References Cited

U.S. PATENT DOCUMENTS

| | | | |
|---|---|---|---|
| 2,368,278 | 1/1945 | Warshaw | 73/724 |
| 4,523,474 | 6/1985 | Browne et al. | 73/718 |
| 4,873,870 | 10/1989 | Delatorre | 73/724 |

*Primary Examiner*—Donald O. Woodiel

[57] ABSTRACT

A pressure sensor comprises a pair of pressure compartments with deflective end walls and an elongated displaceable member with two extremities respectively anchored to the deflective end walls of the two pressure compartments, and a capacitor with first series of capacitor plates affixed to the elongated displaceable member and a second series of capacitor plates disposed in an alternating arrangement with the first series of the capacitor plates and affixed to a stationary member, wherein the pressure difference between the two pressure compartments displaces the elongated displaceable member in axial directions thereof and changes the capacitance value between the first and second series of capacitor plates and, consequently, the numerical value of the differential pressure is determined as a function of the measured value of the capacitance.

9 Claims, 2 Drawing Sheets

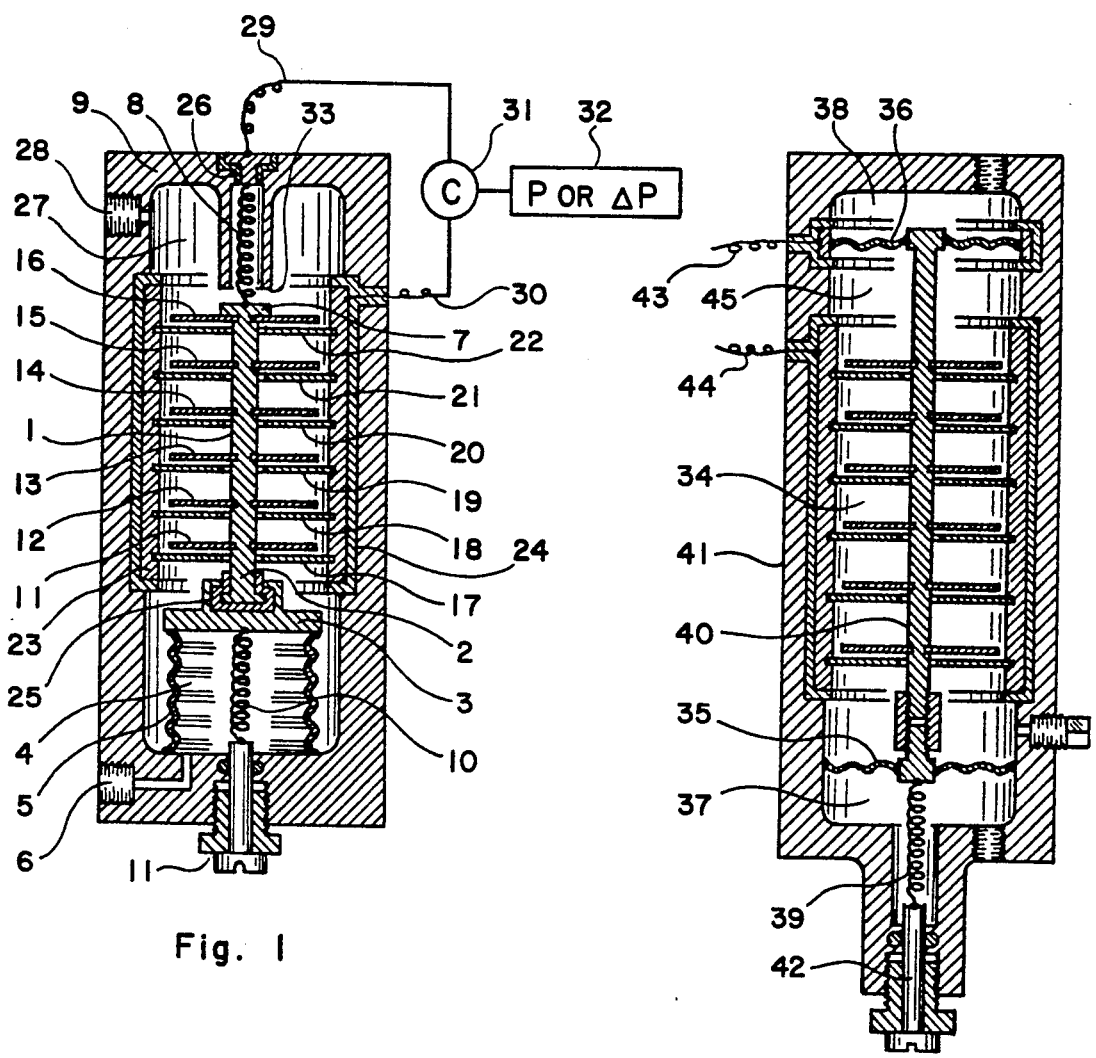
Fig. 1
Fig. 2
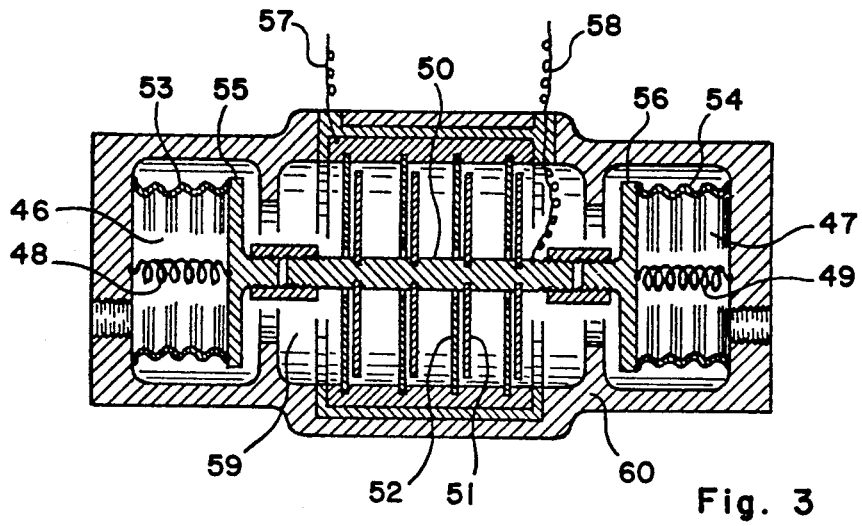
Fig. 3

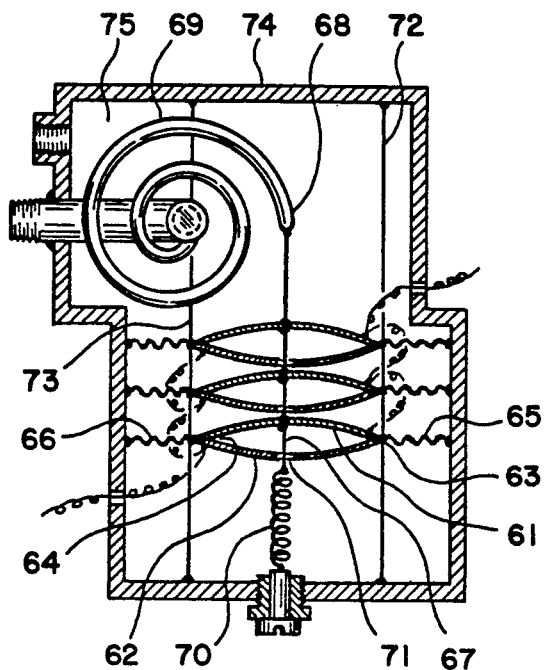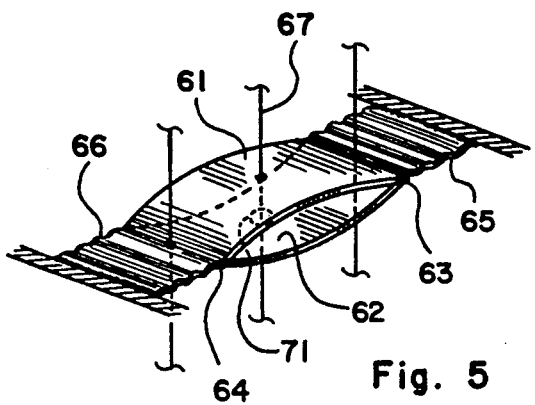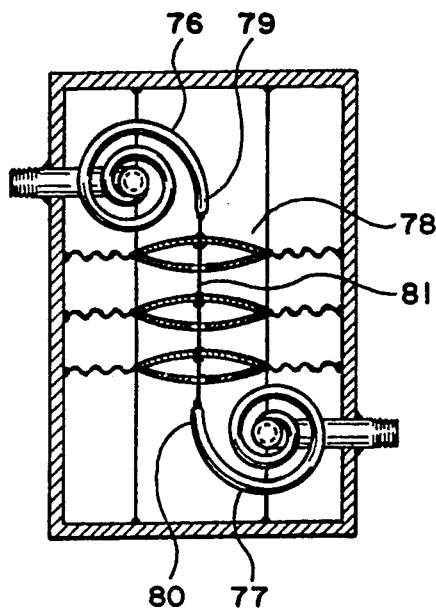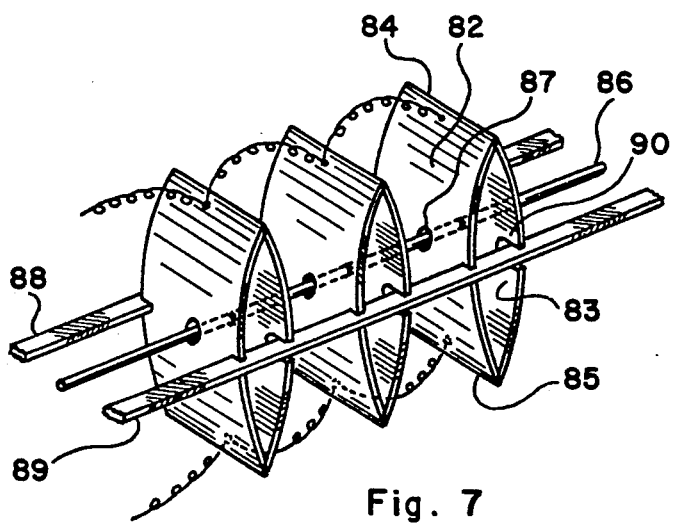
Fig. 4
Fig. 5
Fig. 6
Fig. 7

HIGH RESOLUTION PRESSURE SENSOR

FIELD OF INVENTION

This invention relates to a pressure sensor that measures the absolute pressure, gauge pressure and differential pressure by measuring the change in the numerical value of the capacitance of a capacitor with multiple capacitor plates built into the pressure sensor.

BACKGROUND OF INVENTION

With few exceptions, the existing pressure sensors operating on the principles of capacitance change as a function of the pressure under measurement employ a single or pair of capacitors including a single tensioned diaphragm experiencing a small deflection under pressure loading. As the deflection of the diaphragm is limited to a small value, the turn-down ratio (ratio of the maximum to minimum values of the measurable pressure) and resolution of the existing pressure sensors are less than satisfactory. For example, a differential pressure sensor measuring the dynamic pressure of the fluid flow varying in a range of 100 to 1 must have a 10,000 to 1 range in the differential pressure measurement. A differential pressure sensor with a such a high value of turn-down ratio is not commonly available at the present time.

BRIEF SUMMARY OF INVENTION

The primary object of the present invention is to provide a pressure sensor comprising a displaceable member anchoring a first series of capacitor plates wherein the displaceable member is connected to a single or a pair of bellows or diaphragms and experiences a displacement that varies as a function of the pressure contained in the bellows or diaphragms, and a stationary member affixed to the sensor body and having a second series of capacitor plates, wherein the first and second series of capacitor plates provides a parallel combination of a plurality of dual-plate capacitors, each of which dual-plate capacitors comprising a first capacitor plate belonging to the first series of the capacitor plates and the second capacitor plate belonging to the second series of the capacitor plates. When the value of the pressure contained in the bellows or diaphragms is equal to zero, the two capacitor plates included in the individual dual-plate capacitor are parallel and at close proximity to one another. As the magnitude of the pressure increases from zero to a finite value, the gap between the paired capacitor plates increases and, consequently, the numerical value of the capacitance of the parallel bank of the plurality of dual-plate capacitors experiences a decrease of large magnitude. The numerical value of the pressure is obtained by measuring the numerical value of the capacitance and then converting it to pressure by using an empirically determined mathematical relation therebetween.

Another object is to provide a pressure sensor comprising a parallel combination of a plurality of dual-plate capacitors, each of which dual-plate capacitor comprises two thin planar capacitor plates disposed in a super-imposed arrangement and mechanically bound to one another at two opposite edges. thereof in an arrangement allowing an easy separation therebetween at the midportion thereof, wherein the two capacitor plates included in the individual dual-plate capacitor are respectively affixed to the displaceable member anchored to the bellows or diaphragms and to the stationary member rigidly secured to the sensor body and, consequently, the two capacitor plates bow away from one another as the pressure contained in the bellows or diaphragms increases from zero to a finite value. The numerical value of the pressure is determined from the measured value of capacitance of the parallel bank of the plurality of dual-plate capacitors.

A further object is to provide a bourdon tube type pressure sensor, wherein the over-hanging extremity of a single bourdon tube or a combination of the extremities of a pair of bourdon tubes is coupled to the displaceable member described in the primary or the another object of the present invention described in the preceding paragraphs, and the pressure contained in the single bourdon tube or the differential pressure between the pair of bourdon tubes is determined as a function of capacitance of a capacitor comprising at least one capacitor plate affixed to the displaceable member and another capacitor plate affixed to the stationary member secured to the sensor body.

These and other objects of the present invention will become clear as the description thereof progresses.

BRIEF DESCRIPTION OF FIGURES

The present invention may be described with a greater clarity and specificity by referring to the following figures:

FIG. 1 illustrates a cross section of an embodiment of the capacitive pressure sensor of the present invention.

FIG. 2 illustrates a cross section of another embodiment of the capacitive pressure sensor of the present invention.

FIG. 3 illustrates a cross section of a further embodiment of the capacitive pressure sensor of the present invention.

FIG. 4 illustrates an embodiment of the bourdon tube pressure sensor E with a capacitive read-out means.

FIG. 5 illustrates a perspective view of a single dual-plate capacitor included in a parallel bank thereof employed in the embodiment shown in FIG. 4.

FIG. 6 illustrates another embodiment of the bourdon tube pressure sensor with a capacitive read-out means.

FIG. 7 illustrates a perspective view of an embodiment of the parallel bank of dual-plate capacitors usable in constructing the capacitive pressure sensors of the present invention.

DESCRIPTION OF ILLUSTRATED EMBODIMENTS

In FIG. 1 there is illustrated a cross section of an embodiment of the capacitive pressure sensor of the present invention. The pressure sensor comprises a metallic elongated displaceable member 1 with one extremity 2 anchored to the end plate 3 of a pressure compartment 4 with a cylindrical wall of a bellows construction 5, which pressure compartment 4 has a pressure port 6, and the other extremity 7 anchoring one end of a tension spring 8 with the other extremity anchored to the body 9. Another tension spring 10 with one extremity anchored to the end wall 3 of the pressure compartment 4 and the other extremity anchored to a tension adjusting screw 11 threadedly supported by the body 9 pulls the elongated displaceable member 1 in a direction opposite to the tension exerted by the tension spring 8 and, consequently, the two tension springs 8 and 10 supports the elongated displaceable member 1 at an equilibrium position. A first series of circular capacitor plates 11, 12, 13, 14, 15, 16, etc. are affixed to the elongated displaceable member 1 in a coaxial arrangement. A second series of circular capacitor plates 17, 18, 19, 20, 21, 22, etc. with central holes are disposed coaxially about the elongated displaceable member 1 in an alternating relationship with respect to the first series of the capacitor plates 11, 12, 13, 14, 15, 16, etc. and secured to a metallic stationary circular cylindrical tubing 23 affixed to the body 9. An insulating sleeve 24 electrically isolates the second series of the capacitor plates 17-22 and the cylindrical tubing 23, while the insulating adapters 25 and 26 electrically isolate the first series of the capacitor plates 11-16 and the combination of the elongated displaceable member 1 and the tension spring 8. The compartment 27 housing the capacitor plates 11-22 has a port 28 that may be plugged after evacuating the compartment 27 or connected to a reference pressure source. When there is no pressure loading on the end plate 3 resulting from a pressure difference between the two compartments 4 and 27, each pair of capacitor plates respectively belonging to the first and second series of the capacitor plates and constituting the individual dual-plate capacitor such as the combination of the capacitor plates 11 and 17 should be located at a close proximity to one another as shown in the particular illustrative embodiment. A pressure introduced into the pressure compartment 4 pushes out the end plate 3 and, consequently, the elongated displaceable member 1 experiences a displacement that increases the gap between the two capacitor plates constituting the individual dual-plate capacitor. As a consequence, the capacitance between the first series of capacitor plates 11-16 connected to a common lead wire 29 and the second series of the capacitor plates 17-22 connected to a common lead wire 30 decreases as a function of pressure difference across the end plate 3. A capacitance meter 31 measures the capacitance and supplies the information to a data processor 32 that determines the numerical value of the pressure in the pressure compartment 4 from the measured value of the capacitance by using an empirically obtained mathematical relationship therebetween. When the two compartments 4 and 27 are respectively connected to two different pressure sources, the pressure sensor measures the differential pressure. When the compartment 27 is evacuated, the pressure sensor measures the absolute pressure, while the pressure sensor measures the gauge pressure when the compartment 27 is open to the atmospheric pressure. When the tension adjusting screw 11 is set in such a way that each pair of capacitor plates such as the elements 11 and 17 are positioned at a close proximity or in contact with one another (the capacitor plates should be lined with an insulating layer when the contact therebetween is allowed), when there is no pressure difference across the end plate 3 as shown in the particular illustrative embodiment, the numerical value of the capacitance decreases with increasing gap between each pair of capacitor plates much more steeply than in a linear relationship therebetween. As a consequence, decreasing capacitance represents increasing pressure, wherein the resolution and the sensitivity of pressure measurement is high for low values of the pressure, and low for high values of the pressure. In an alternative operation wherein the tension adjusting screw 11 is set in such a way that each capacitor plate such as the element 11 belonging to the first series of the capacitor plates is located at a half way between each pair of capacitor plates such as the elements 17 and 18 belonging to the second series of the capacitor plates, when there is no pressure difference across the end plate 3, the capacitance increases with increasing value of the pressure in the compartment 4 much more steeply than in a linear relationship therebetween. As a consequence, the resolution and the sensitivity of pressure measurement is low for low values of the pressure and high for high values of the pressure. It is readily noticed that the stop 33 limiting the displacement of the elongated displaceable member 1 has to be modified in the above-described alternative operation.

In FIG. 2, there is illustrated a cross section of another embodiment of the capacitive pressure sensor of the present invention, which comprises a capacitor 34 with multiple capacitor plates the same as that described in conjunction with FIG. 1 disposed intermediate two diaphragms 35 and 36 respectively constituting end plates of two pressure compartments 37 and 38. In this embodiment, the pressure sensor may operate without any tension springs such as the element 38 as the two diaphragms 35 and 36 support the elongated displaceable member 40 at the coaxial position with respect to the capacitor plates affixed to the body 41 and provides spring force acting in lateral directions thereto that counter-balances the pressure force thereon. However, it provides a flexibility in operation to include at least one tension spring 39 with a tension adjusting screw 42, while another tension spring that pulls the elongated displaceable member 40 in a direction opposite to the tension spring 39 may be included at the end of the elongated displaceable member 40 anchored to the diaphragm 36, wherein the diaphragm 36 may be omitted. The differential pressure between the two compartments 37 and 38 is determined as a function of capacitance between two lead wires 43 and 44 respectively connected to the two parallel combinations of the capacitor plates included in capacitor 34 in one of the two modes of operation described in conjunction with FIG. 1. The compartment 45 housing the capacitor 34 may be evacuated, or filled with air or other desirable media.

In FIG. 3 there is illustrated a cross section of a further embodiment of the capacitive pressure sensor of the present invention, that has essentially the same construction and operating principles as the embodiment shown in FIG. 2 with an exception that the two bellows type pressure compartments 46 and 47 are now employed in place of the two diaphragm type pressure chambers. Of course, the pair of tension springs 48 and 49 pulling the elongated displaceable member 50 in two opposite directions at the two extremities thereof have to be included for the sake of the operational convenience mentioned in conjunction with FIG. 1 and for the support of the elongated displaceable member 50 at the coaxial position.

It can be easily shown that the change $\Delta d$ in the separation distance between each pair of capacitor plates 51 and 52 constituting the individual dual-plate capacitor is related to the pressure difference $\Delta p$ between the two pressure compartments 53 and 54 by the equation.

$$(K_1+K_2)\Delta d=S\Delta p, \tag{1}$$

where $K_1$ and $K_2$ are spring coefficients of the tension springs 48 and 49, the change $\Delta d$ in the separation distance between each pair of capacitive plates is measured from the initial value thereof existed under zero differential pressure, S is the net pressure receiving area of the end plates 55 and 56 of the pressure compartments 53 and 54, and Δp is the differential pressure therebetween. The capacitance C across the two lead wires 57 and 58 connected to a parallel bank of N different dual-plate capacitors is equal to $$C = \frac{\epsilon A f(\Delta d) N}{d_0 + \Delta d}, \quad (2)$$

where $\epsilon$ is the electrical permitivity of the media filling up the compartment 59, A is the electrically effective inter-face area of the capacitor plates, $d_0$ is the initial value of the separation distance between the capacitor plates, and $f(\Delta d)$ is the correction factor taking care of the edge-effect of the capacitor plates, that is equal to the unity when the separation distance $(d_0 + \Delta d)$ is much smaller than the capacitor plate area A. A combination of equations (1) and (2) yields equation $$\Delta p = \frac{\epsilon(K_1 + K_2)AN}{S}\left[\frac{g(C)}{C} - \frac{1}{C_0}\right], \quad (3)$$

where $g(C)$ is $f(\Delta d)$ wherein $\Delta d$ solved as a function of C by equation (1) is substituted into $f(\Delta d)$, and $C_0$ is the initial value of capacitance corresponding to the initial value of separation distance do . Equation (3) applies when the spring tensions of the tension spring 48 and 49 are set in such a way that the separation distance between each pair of capacitor plates 51 and 52 increases with increasing value of the differential pressure and is limited to one half of distance between two adjacent capacitor plates belonging to the stationary series thereof affixed to the body 60. In an alternative operation wherein the capacitor plate 51 is initially placed half way between two adjacent capacitor plates belonging to the stationary series of plate thereof affixed to the body, wherein the separation distance between each pair of capacitor plates 51 and 52 decreases with increasing value of the differential pressure, it can be easily shown that equation (3) takes the form $$\Delta p = \frac{\epsilon(K_1 + K_2)AN}{S}\left[\frac{1}{C_0} - \frac{g(C)}{C}\right]. \quad (4)$$

In FIG. 4 there is illustrated an embodiment of the bourdon tube pressure sensor including an electronic read-out device comprising a single or parallel bank of a plurality of dual-plate capacitors. Each individual dual-plate capacitor comprises a pair of thin metallic plates 61 and 62 lined with an insulating layer, which are bound to one another at the two opposite edges 63 and 64 in such a way that the middle portions thereof are allowed to bow away from one another easily. The two bound edges 63 and 64 are respectively connected to two corrugated planar tension springs 65 and 66 exerting a tension on the pair of capacitor plates 61 and 62 following the middle plane therebetween. The displaceable elongated member 67 with one extremity affixed to the over-hanging end 68 of the bourdon tube 69 and the other extremity connected to a tension spring 70 and extending through the pair of capacitor plates 61 and 62 is affixed to the first capacitor plate 61 at the center portion thereof, and engages and extends through a over-sized hole 70 included in the center portion of the second capacitor plate 62. The bound edges 63 and 64 of the individual dual-plate capacitor are tethered together by a pair of flexible planar or elongated members 72 and 73 which are anchored to the body 74 at both extremities thereof. This embodiment operates on essentially the same principles as set forth by equation (3) with $K_2$ set equal to zero. The advantage of the capacitor included in this particular illustrative embodiment is the light-weight thereof. When the planar capacitor plates 61, 62, etc. have a sufficient stiffness tending to maintain the flat shape thereof, the corrugated planar springs 65, 66, etc. and/or the tension spring 70 may be omitted. The compartment 75 housing the bourdon tube 69 may be evacuated, open to atmospheric pressure, or connected to a second source of pressure depending on the type of pressure being measured by the apparatus. Of course, the capacitor with construction shown in conjunction with FIGS. 1, 2 and 3 may be employed in place of the particular capacitor shown in FIG. 4. In such an alternative design, it is generally necessary to include a second tension spring connected to the extremity 68 of the bourdon tube 69, that pulls the elongated displaceable member 67 in a direction opposite to the tension spring 70. Of course, the capacitor employed in the embodiment shown in FIG. 4 may be employed in constructing the capacitive pressure sensors shown in FIGS. 1, 2 and 3 in place of the capacitor shown with those particular embodiments.

In FIG. 5 there is illustrated a perspective view of the individual dual-plate capacitor constituting the parallel bank of the dual plate capacitors included in the embodiment shown in FIG. 4. The two corrugated planar tension springs 65 and 66 pull the bound edges 63 and 64 of the two thin capacitor plates 61 and 62. The elongated displaceable member 67 extending through the pair of the capacitor plates 61 and 62 is anchored to the first capacitor plate 61 at the central portion thereof, while it extends through a centrally located hole 71 disposed through the second capacitor plate 62 in a free sliding relationship.

In FIG. 6 there is illustrated an embodiment of the differential pressure sensor comprising a pair of bourdon tubes 76 and 77 disposed on a common plane axisymmetrically about an axis perpendicular to the plane and a capacitor 78 having essentially the same construction as that described in conjunction with FIGS. 4 and 5 disposed intermediate the over-hanging extremities 79 and 80 of the two bourdon tubes 76 and 77, wherein the two extremities of the elongated displaceable member 81 are respectively anchored to the over-hanging extremities 79 and 80 of the two bourdon tubes 76 and 77. One or both extremities of the elongated displaceable members 81 may include tension springs as exemplified by the arrangement shown in FIG. 2 or 3. The particular type of capacitor shown in FIG. 6 may be replaced by the type shown in FIG. 3.

In FIG. 7 there is illustrated an embodiment of the parallel bank of a plurality of dual-plate capacitors, that can replace the capacitors employed in the embodiments shown in FIGS. 1, 2, 3, 4 and 6. Each individual dual plate capacitor included in this particular parallel combination thereof comprises a pair of thin capacitor plates 82 and 83 bound together at two opposite extremities 84 and 85 thereof, wherein the two capacitor plates 82 and 83 have a stiffness recovering the flat shape thereof in the absence of forces pulling the two capacitor plates apart. The elongated displaceable member 86 extending through the pair of capacitor plates 82 and 83 is anchored to the central portion of the first capacitor plate 83, while it engages and extends through a centrally located hole 87 disposed through the second capacitor plate 82 in a free-sliding relationship. The two opposite edges of the middle section of the second capacitor plate 82 intermediate the two bound edges 84 and 85 are respectively affixed to a pair of elongated stationary members 88 and 89, which extend through slitted cut outs 90 included in the two opposite edges of the middle section of the first capacitor plate 82 intermediate the two bound edges 84 and 85. Of course, the extremities of the elongated displaceable member 86 are connected to a deflective portion of the pressure containing elements or to tension springs as shown in FIGS. 1, 2, 3, 4, and 6, while the stationary elongated members 88 and 89 are secured to the body structure of the pressure sensor.

While the principles of the present invention have been made clear by the illustrative embodiments, there will be many modifications of the structures, arrangements, proportions, elements and materials, which are obvious to those skilled in the art and particularly adapted to the specific working environments and operating conditions in the practice of the invention without departing from those principles. It is not desired to limit the invention to the particular illustrative embodiments shown and described and accordingly, all suitable modifications and equivalents may be regarded as falling within the scope of the invention as defined by the claims which follow.

The embodiments of the invention, in which an exclusive property or privilege is claimed, are defined as follows:

1. An apparatus for measuring pressure comprising in combination:
    a) at least one pressure containing enclosure with a pressure port having a wall structure including a deflective portion experiencing a displacement under pressure loading from pressure contained in said at least one pressure containing enclosure;
    b) an elongated member with one extremity connected to the deflective portion of the wall structure of said at least one pressure containing enclosure in a relationship wherein a deflection of the deflective portion of the wall structure of said at least one pressure containing enclosure creates a displacement of the elongated member;
    c) a first plurality of capacitor plates distributed in a parallel and spaced relationship following the elongated member and affixed to to the elongated member, and a second plurality of capacitor plates distributed in a parallel and spaced relationship following the elongated member in a parallel and alternating relationship with respect to the first plurality of capacitor plates and affixed to a stationary member extending in a direction defined by the elongated member, wherein each pair of capacitor plates adjacent to one another and respectively affixed to the elongated member and the stationary member constitutes each of a plurality of dual-plate capacitors, and the elongated member extends through an opening disposed through each of the first plurality of capacitor plates in a mutually affixed nonslidable relationship and through an opening disposed through each of the second plurality of capacitor plates in a freely sliding relationship therebetween; and each pair of capacitor plates included in each of the plurality of dual-plate capacitors are mechanically connected to one another at two opposite edges of the combination of said each pair of capacitor plates; wherein separation distance between each pair of capacitor plates included in each of the plurality of dual-plate capacitors varies as the elongated member experiences a displacement;
    d) a first electrical terminal commonly connected to the first plurality of capacitor plates and a second electrical terminal commonly connected to the second plurality of capacitor plates; and
    e) means for determining pressure contained in said at least one pressure containing enclosure as a function of electrical capacitance between said first and second electrical terminals.

2. An apparatus as defined in claim 1 wherein the deflective portion of the wall structure of said at least one pressure containing enclosure comprises an end wall of a bellow structure constituting the wall structure of said at least one pressure containing enclosure, and the combination of said end wall and the elongated member includes a spring bias means providing a counter acting force against the pressure loading on said end wall.

3. An apparatus as defined in claim 2 wherein said combination includes another pressure containing enclosure with a pressure port having a wall structure including an end wall of a bellow structure constituting the wall structure of said another pressure containing enclosure, wherein the other extremity of the elongated member opposite to said one extremity is connected to said end wall of the bellow structure included in said another pressure containing enclosure and the combination of said end walls and the elongated member includes a spring bias means providing a counter acting force against difference in the pressure loading between said at least one and another pressure containing enclosures, and said means for determining pressure determines difference between the pressure in said at least one pressure containing enclosure and the pressure in said another pressure containing enclosure.

4. An apparatus as defined in claim 1 wherein the deflective portion of the wall structure of said at least one pressure containing enclosure comprises a diaphragm, and the combination of said diaphragm and the elongated member includes a spring bias means providing a counter acting force against the pressure loading on said diaphragm.

5. An apparatus as defined in claim 4 wherein said combination includes another pressure containing enclosure with a pressure port having a wall structure including a diaphragm, wherein the other extremity of the elongated member opposite to said one extremity is connected to said diaphragm included in said another pressure containing enclosure and the combination of said diaphragms and the elongated member includes a spring bias means providing a counter acting force against difference in the pressure loading between said at least one and another pressure containing enclosures, and said means for determining pressure determines difference between the pressure in said at least one pressure containing enclosure and the pressure in said another pressure containing enclosure.

6. An apparatus as defined in claim 1 wherein the deflective portion of the wall structure of said at least one pressure containing enclosure comprises an overhanging extremity of a bourdon tube.

7. An apparatus as defined in claim 6 wherein the other extremity of the elongated member opposite to said one extremity is biased by a tension spring depending from a stationary structure.

8. An apparatus as defined in claim 6 wherein said combination includes another pressure containing enclosure comprising another bourdon tube, wherein the other extremity of the elongated member opposite to said one extremity is connected to an over-hanging extremity of said another bourdon tube, wherein said means for determining pressure determines difference between the pressure in said at least one pressure containing enclosure and the pressure in said another pressure containing enclosure.

9. An apparatus as defined in claim 8 wherein the combination of the over-hanging extremities of said a and another bourdon tubes and the elongated member includes a spring bias means providing a counter acting force against difference in the pressure loading between said a and another bourdon tubes.

* * * * *